United States Patent
Farley et al.

(10) Patent No.: US 10,544,650 B2
(45) Date of Patent: Jan. 28, 2020

(54) ROTATING DISK VALVE FOR ROTARY STEERABLE TOOL

(71) Applicant: Weatherford Technology Holdings, LLC, Houston, TX (US)

(72) Inventors: Steven Reid Farley, Magnolia, TX (US); Robert G. Conger, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 186 days.

(21) Appl. No.: 15/796,845

(22) Filed: Oct. 29, 2017

(65) Prior Publication Data
US 2019/0128096 A1 May 2, 2019

(51) Int. Cl.
*E21B 7/06* (2006.01)
*E21B 34/06* (2006.01)

(52) U.S. Cl.
CPC ............... *E21B 34/06* (2013.01); *E21B 7/06* (2013.01); *E21B 7/067* (2013.01)

(58) Field of Classification Search
CPC ... Y10T 137/86863; F16K 3/085; F16K 3/08; F16K 11/074; E21B 7/06
USPC .................................................... 137/625.46
See application file for complete search history.

(56) References Cited

U.S. PATENT DOCUMENTS

| | | | | |
|---|---|---|---|---|
| 732,010 A | * | 6/1903 | Savage | ............... F16K 11/074 |
| | | | | 137/625.46 |
| RE23,324 E | * | 1/1951 | Moody | ............... F16K 11/074 |
| | | | | 137/624.15 |
| 5,277,144 A | * | 1/1994 | Moody | ............... B63G 8/38 |
| | | | | 114/316 |
| 5,520,255 A | | 5/1996 | Barr et al. | |
| 5,685,379 A | | 11/1997 | Barr et al. | |
| 6,089,332 A | | 7/2000 | Barr et al. | |
| 6,962,214 B2 | | 11/2005 | Hughes et al. | |
| 7,849,936 B2 | | 12/2010 | Hutton | |
| 8,708,064 B2 | | 4/2014 | Downton et al. | |
| 2009/0090557 A1 | * | 4/2009 | Vuyk, Jr. | ............... E21B 7/16 |
| | | | | 175/54 |
| 2012/0160563 A1 | | 6/2012 | Clark et al. | |
| 2013/0341098 A1 | | 12/2013 | Perrin et al. | |

(Continued)

OTHER PUBLICATIONS

Int'l Search Report and Written Opinion issued in copending PCT Application No. PCT/US2018/050085 dated Jan. 4, 2019, 11 pages.

*Primary Examiner* — Giovanna C Wright
(74) *Attorney, Agent, or Firm* — Blank Rome, LLP

(57) ABSTRACT

A rotary steerable tool used for directional drilling include a housing, at least one external director, and at least one valve. The external director is hydraulically movable to an extended condition relative to the housing, and the valve selectively directs pressurized fluid from a first side of the valve to the external director on the valve's second side. A first seal of the valve is selectively orientable about an axis and has an inlet, which communicates with the pressurized fluid from the first side. A second seal of the valve disposed adjacent the first seal has an outlet, which communicates the pressurized fluid to the second side at least when aligned with the inlet. A bearing assembly of the valve is disposed at the axis between the seals and has male and female bearing surfaces, which are angled off the axis and are mated with one another.

38 Claims, 7 Drawing Sheets

(56) References Cited

U.S. PATENT DOCUMENTS

2014/0014413 A1 1/2014 Niina et al.
2016/0084007 A1 3/2016 Sugiura

* cited by examiner

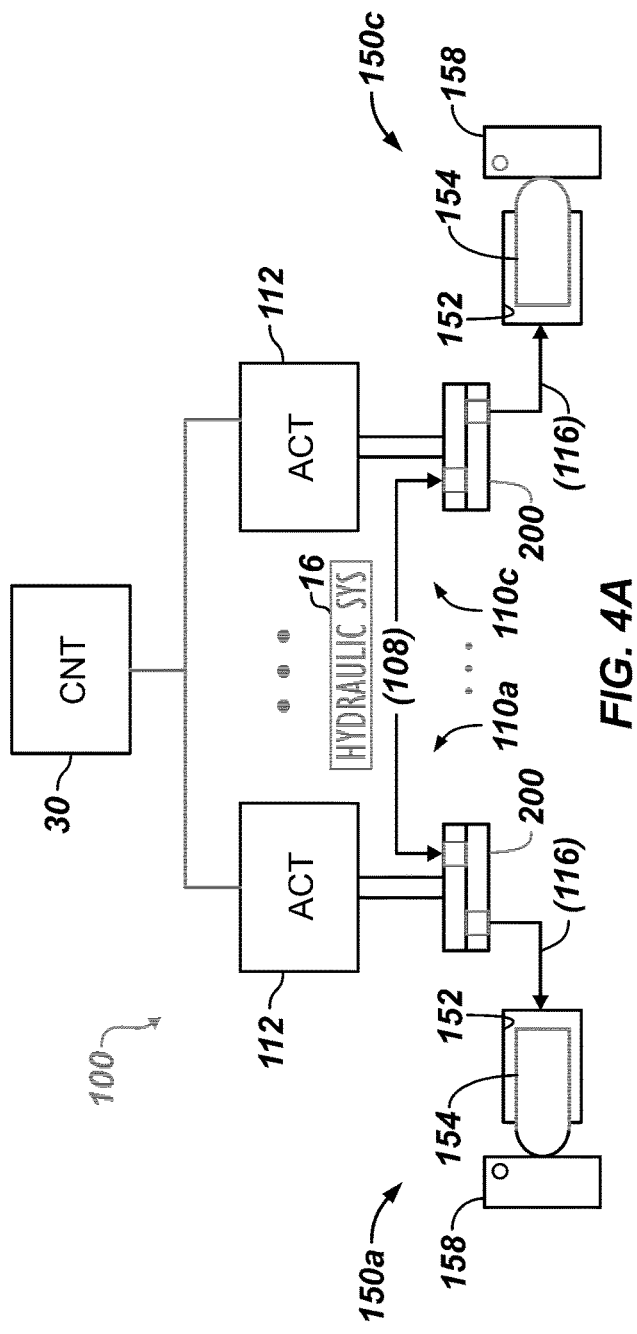
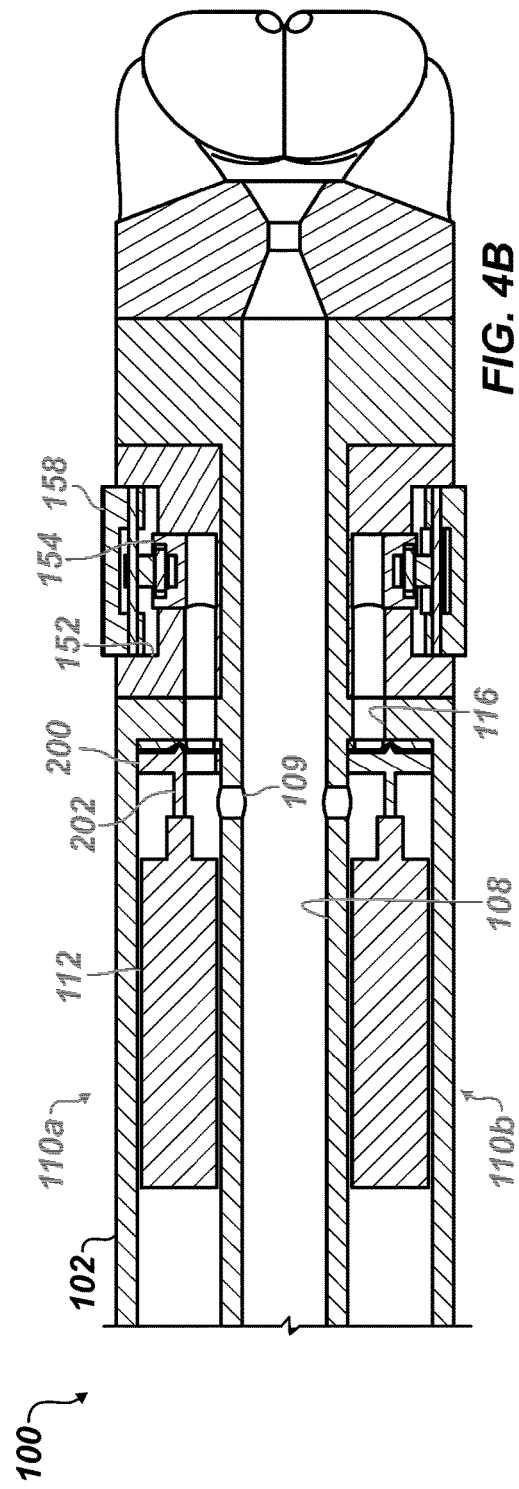
FIG. 4A
FIG. 4B

ROTATING DISK VALVE FOR ROTARY STEERABLE TOOL

FIELD OF THE DISCLOSURE

The subject matter of the present disclosure relates to an apparatus and method for controlling a downhole assembly. The subject matter is likely to find its greatest utility in controlling a steering mechanism of a downhole assembly to steer a drill bit in a chosen direction, and most of the following description will relate to steering applications. It will be understood, however, that the disclosed subject matter may be used to control other parts of a downhole assembly.

BACKGROUND OF THE DISCLOSURE

When drilling for oil and gas, it is desirable to maintain maximum control over the drilling operation, even when the drilling operation may be several kilometers below the surface. Steerable drill bits can be used for directional drilling and are often used when drilling complex borehole trajectories that require accurate control of the path of the drill bit during the drilling operation.

Directional drilling is complicated because the steerable drill bit must operate in harsh borehole conditions. For example, the steering mechanism must reliably operate under exceptional heat, pressure, and vibration conditions that will typically be encountered during the drilling operation. Additionally, the steering mechanism is typically disposed near the drill bit, and the desired real-time directional control of the steering mechanism is remotely controlled from the surface. Regardless of its depth within the borehole, the steering mechanism must maintain the desired path and direction and must also maintain practical drilling speeds.

Many types of steering mechanism are used in the industry. A common type of steering mechanism has a motor disposed in a housing with a longitudinal axis that is offset or displaced from the axis of the borehole. The motor can be of a variety of types including electric and hydraulic. Hydraulic motors that operate using the circulating drilling fluid are commonly known as a "mud" motors.

The laterally offset motor housing, commonly referred to as a bent housing or "bent sub", provides lateral displacement that can be used to change the trajectory of the borehole. By rotating the drill bit with the motor and simultaneously rotating the motor housing with the drillstring, the orientation of the housing offset continuously changes, and the path of the advancing borehole is maintained substantially parallel to the axis of the drillstring. By only rotating the drill bit with the motor without rotating the drillstring, the path of the borehole is deviated from the axis of the non-rotating drillstring in the direction of the offset on the bent housing.

Another steering mechanism is a rotary steerable tool that allows the drill bit to be moved in any chosen direction. In this way, the direction (and degree) of curvature of the borehole can be determined during the drilling operation, and can be chosen based on the measured drilling conditions at a particular borehole depth.

A common way to deflect a rotary steerable tool is to use a piston to energize a pad. The pad pushes against the formation in order to generate bit side force to deviate the wellbore. To move the piston, the rotary steerable tool typically supplies pressurized drilling fluid from the tool to the piston using hydraulic controls. As will be appreciated, operating the hydraulic control with precision and reliability can be complicated by the harsh operation environment and by the rotation of the tool, which can average 300-rpm or more.

Although various steering mechanisms are effective, operators are continually looking for faster, more powerful, reliable, and cost effective directional drilling mechanisms and techniques. The subject matter of the present disclosure is directed to such an endeavor.

SUMMARY OF THE DISCLOSURE

According to the present disclosure, a valve directs pressurized fluid from a first side of the valve to a second side of the valve. The valve comprises a first seal, a second seal, and a bearing assembly. The valve, for example, can be a rotary disk valve having selective and non-selective disks for the seals.

The first seal is selectively orientable about an axis and has at least one inlet, which communicates with the pressurized fluid from the valve's first (inlet) side. The second seal is disposed adjacent the first seal and has at least one outlet, which communicates the pressurized fluid to the valve's second (outlet) side at least when aligned with the at least one inlet. The bearing assembly is disposed at the axis between the first and second seals. The bearing assembly has a male bearing surface and a female bearing surface, which are mated with one another and have an interface angled off the axis. The valve can comprise a rotary actuator operable to selectively orient the first seal about the axis relative to the second seal.

In one example, the male bearing surface can comprise a conical surface disposed about the axis, and the female bearing surface can comprises a conical seat disposed about the axis and engaging the conical surface thereagainst. In another example, the male bearing surface can comprise a spherical surface disposed about the axis, and the female bearing surface can comprise a spherical seat disposed about the axis and engaging the spherical surface thereagainst.

In general, the male bearing surface is subject to a first pressure from the pressurized fluid on the first side acting against the first seal. The female bearing surface held in the housing counteracts the first pressure. In one arrangement, the conical or spherical seat of the female bearing surface can define a bore therethrough along the axis. In this way, the male bearing surface can be subjected to a second pressure from the pressurized fluid on the valve's second side, which can improve its engagement with the female bearing surface.

The bearing assembly disposed between the first and second seals can separate adjacent seal surfaces of the first and second seals by a separation, which can form a fluid seal in the separation. The bearing assembly can comprises a first material different from a second material of the first and second seals. In fact, the male bearing can be an independent component disposed on, affixed to, embedded in, etc. the first seal, and the female bearing can be an independent component disposed on, affixed to, embedded in, etc. the second seal. Therefore, the first seal and the male bearing can be made of different materials, as can the second seal and the female bearing. Likewise, the male and female bearings can be composed of different materials. Alternatively, the male bearing can be integrally formed as part of the first seal, and the female bearing can be integrally defined as part of the second seal. Finally, the male and female bearings, whether independent or integral components, can have surface coatings for wear resistance and reduced friction.

According to the present disclosure, a rotary steerable tool is used for directional drilling with a drillstring and a drill bit. The tool comprises a housing, and least one external director, and at least one valve. The housing is disposed between the drillstring and the drill bit and communicates drilling fluid from the drillstring to the drill bit. The at least one external director is disposed on the housing and is hydraulically movable to an extended condition relative to the housing.

The at least one valve is disposed on the housing. To extend the at least one director, the at least one valve selectively directs pressurized source fluid from a first side of the valve to the at least one external director on a second side of the valve. The at least one valve comprises a first seal, a second seal, and a bearing assembly.

As before, the first seal is selectively orientable about an axis and has at least one inlet, which communicates with the pressurized source fluid from the valve's first (inlet) side. The second seal is disposed adjacent the first seal and has at least one outlet, which communicates the pressurized source fluid to the valve's second (outlet) side at least when aligned with the at least one inlet. The bearing assembly is disposed at the axis between the first and second seals and has a male bearing surface and a female bearing surface, which are angled off the axis and are mated with one another. Features of the seals and bearing assembly of the at least one valve can be the same as those discussed previously.

The housing can define a bore communicating the drilling fluid, and the bore can define at least one port in communication with the first side of the at least one valve to provide at least a portion of the drilling fluid as the pressurized source fluid. A filter can filter the drilling fluid from the bore to the port. Alternatively, the pressurized source fluid can be hydraulic fluid communicated from a hydraulic system or can be fluid from another source.

In one configuration, the tool comprises more than one of the at least one external directors, and the at least one valve can include one valve that selectively directs at least portion of the pressurized fluid to the more than one external directors. An actuator can be operable to selectively orient the first seal of the at least one valve about the axis. The actuator can be roll-stabilized relative to rotation of the housing, for example, by being counter-rotated with a motor, turbine, etc. At least one controller can sense orientation of the roll-stabilized actuator relative to a point of reference and can actuate the actuator to selectively orient the first seal relative to the point of reference.

In another configuration, the tool comprises more than one of the at least one external directors and comprises more than one of the at least one valve. Each of the external directors has a respective one of the valves selectively directing at least the portion of the pressurized fluid to the external director. A plurality of actuators is each operable to selectively orient the first seal of the respective valve about the axis. In this way, each of the actuators rotates with the housing, and at least one controller senses orientation of each of the actuators relative to a point of reference and actuates each of the actuators to selectively orient the respective first seal relative to the point of reference.

The foregoing summary is not intended to summarize each potential embodiment or every aspect of the present disclosure.

BRIEF DESCRIPTION OF THE DRAWINGS

FIG. 4A schematically illustrates another embodiment of the steering apparatus having multiple actuators and rotary disk valves to independently control multiple directors.

FIG. 4B illustrates a cross-section of the steering apparatus in FIG. 4A.

DETAILED DESCRIPTION OF THE DISCLOSURE

Figure 1:
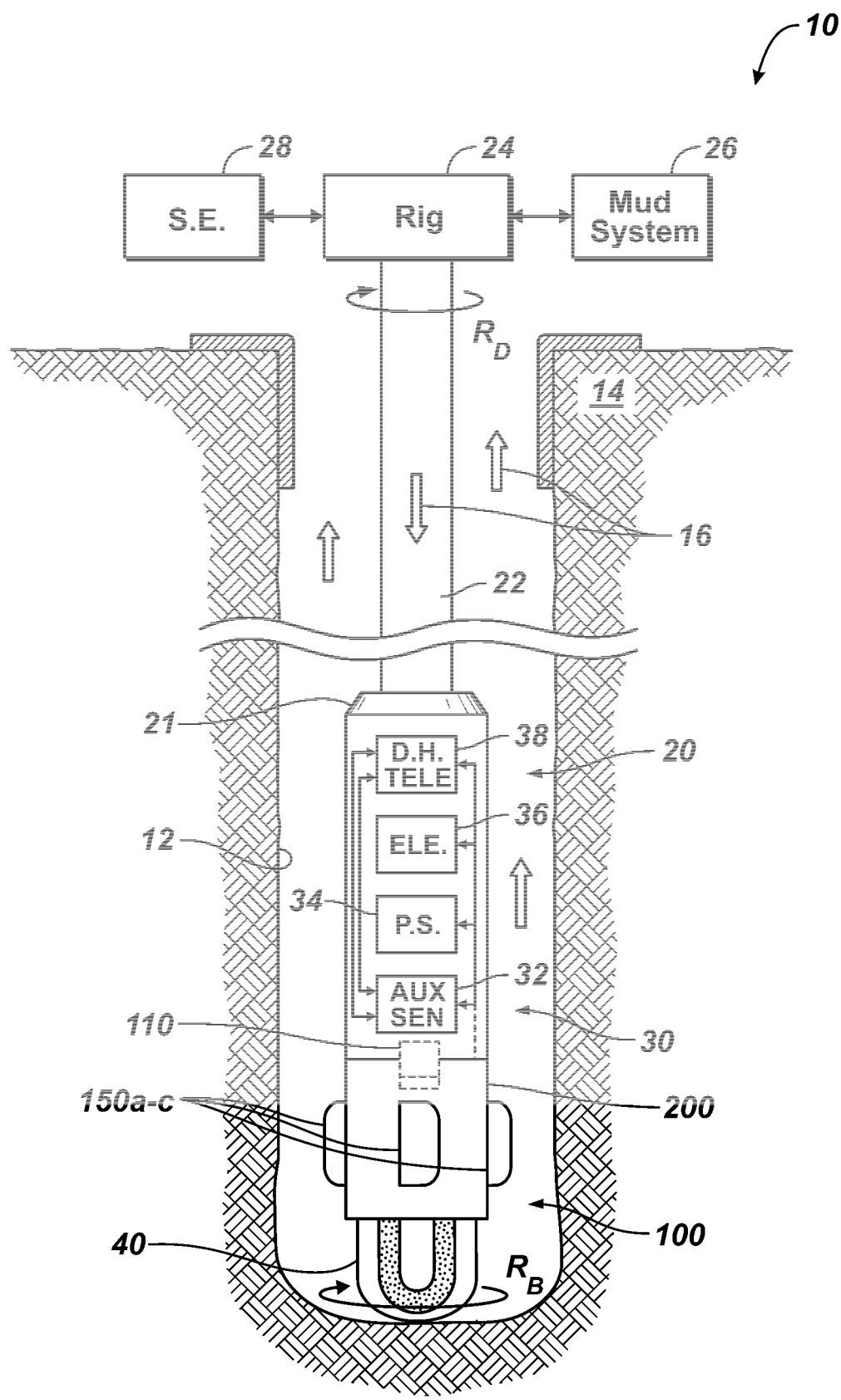
FIG. 1 schematically illustrates a drilling system incorporating a steering apparatus with a rotary disk valve according to the present disclosure.

FIG. 1 schematically illustrates a drilling system 10 incorporating a steering apparatus 100 according to the present disclosure. As shown, a downhole drilling assembly 20 drills a borehole 12 penetrating an earth formation. The assembly 20 is operationally connected to a drillstring 22 using a suitable connector 21. In turn, the drillstring 22 is operationally connected to a rotary drilling rig 24 or other known type of surface drive.

The downhole assembly 20 includes a control assembly 30 having a sensor section 32, a power supply section 34, an electronics section 36, and a downhole telemetry section 38. The sensor section 32 has directional sensors, such as accelerometers, magnetometers, and inclinometers, which can be used to indicate the orientation, movement, and other parameters of the downhole assembly 20 within the borehole 12. This information, in turn, can be used to define the borehole's trajectory for steering purposes. The sensor section 32 can also have any other type of sensors used in Measurement-While-Drilling (MWD) and Logging-While-Drilling (LWD) operations including, but not limited to, sensors responsive to gamma radiation, neutron radiation, and electromagnetic fields.

The electronics section 36 has electronic circuitry to operate and control other elements within the downhole assembly 20. For example, the electronics section 46 has downhole processor(s) (not shown) and downhole memory (not shown). The memory can store directional drilling parameters, measurements made with the sensor section 32, and directional drilling operating systems. The downhole processor(s) can process the measurement data and telemetry data for the various purposes disclosed herein.

Elements within the downhole assembly 20 communicate with surface equipment 28 using the downhole telemetry section 28. Components of this telemetry section 38 receive and transmit data to an uphole telemetry unit (not shown)

within the surface equipment 38. Various types of borehole telemetry systems can be used, including mud pulse systems, mud siren systems, electromagnetic systems, angular velocity encoding, and acoustic systems.

The power supply section 34 supplies electrical power necessary to operate the other elements within the assembly 20. The power is typically supplied by batteries, but the batteries can be supplemented by power extracted from the drilling fluid by way of a power turbine, for example.

During operation, a drill bit 40 is rotated, as conceptually illustrated by the arrow RB. The rotation of the drill bit 40 is imparted by rotation RD of the drillstring 22 at the rotary rig 24. The speed (RPM) of the drillstring rotation RD is typically controlled from the surface using the surface equipment 28. Additional rotation to the drill bit 40 can also be imparted by a drilling motor (not shown) on the drilling assembly 20.

During operation, the drilling fluid system 26 pumps drilling fluid or "mud" from the surface downward and through the drillstring 22 to the downhole assembly 20. The mud exits through the drill bit 40 and returns to the surface via the borehole annulus. Circulation is illustrated conceptually by the arrows 16.

To directionally drill the advancing borehole 12 with the downhole assembly 20, the steering apparatus 100 has at least one controller 110 having at least one rotating disk valve 200. The control assembly 30 operates the at least one controller 110 to orient the at least one valve 200 and change delivery of a portion of the flow of the fluid (circulated drilling mud) to one or more of the directional devices or directors 150a-c of the rotating steering apparatus 100. This rotary disk valve 200 may be 2-way (ON-OFF), but may stop at any point throughout one rotation to provide a proportionate amount of flow.

During operation of the at least one controller 110, the apparatus 100 may rotate with the drillstring 22 and may rotate at the same rate as the drillstring 22. Of course, the apparatus 100 can be used with a downhole drilling motor (not shown) disposed uphole of the apparatus 100. In this situation, the apparatus 100 can rotate at the output speed of the motor if the drillstring 22 is not rotating, at the output speed of the drillstring 22 if the motor is clutched, or at the combined output of the drillstring 22 and motor if both are rotating. Accordingly, the apparatus 100 can generally be said to always rotate at drill bit speed.

By operating the multiple directors 150a-c during rotation, the steering apparatus 100 steers the advancing borehole 12 using active deflection as the apparatus 100 rotates. During operation, for example, the control assembly 30 controls the flow of fluid through the downhole assembly 20 and delivers portions of the fluid to the directional devices 150a-c of the steering apparatus 100. Due to the rotation of the apparatus 100, the control assembly 30 can change delivery of the fluid to each of the multiple directors 150a-c either independently, cyclically, consecutively, simultaneously, or the like to alter the direction of the steering apparatus 100 as it advances the borehole 12. In turn, the directional devices 150a-c then use the application/release of the pressure from the delivered flow to periodically extend/retract relative to the drill bit's rotation $R_B$ to define the trajectory of the advancing borehole 12.

In one embodiment, the apparatus 100 includes one controller 110 and one rotary disk valve 200 disposed in a non-rotating (counter-rotating) platform of the apparatus 100. The controller 110 and disk valve 200 can consecutively actuate each of the directors 150a-c when aligned to an orientation of the platform. In an alternative embodiment, each of the directors 150a-c can have a controller 110 and a rotary disk valve 200, which rotate with the apparatus 100. Each controller 110 can operate its disk valve 200 to independently actuate its corresponding director 150a-c when desired.

In either case, the extension/retraction of the directional devices 150a-c can be coordinated with the orientation of the drilling assembly 20 in the advancing borehole 12 to control the trajectory of drilling, to drill straight ahead, and to enable proportional dogleg control. To do this, the control assembly 30 can be controlled using orientation information measured by the sensor section 32 cooperating with control information stored in the downhole memory of the electronics section 36 to direct the trajectory of the advancing borehole 12. In the end, the extension/retraction of the directional devices 150a-c applies a lateral bias or bit side forces that engages the drill bit 40 against a certain side in the advancing borehole 12 for directional drilling.

Given the above description of the drilling system 10 and the steering apparatus 100, discussion now turns to embodiments of the steering apparatus 100 to achieve directional drilling.

Figure 2A:
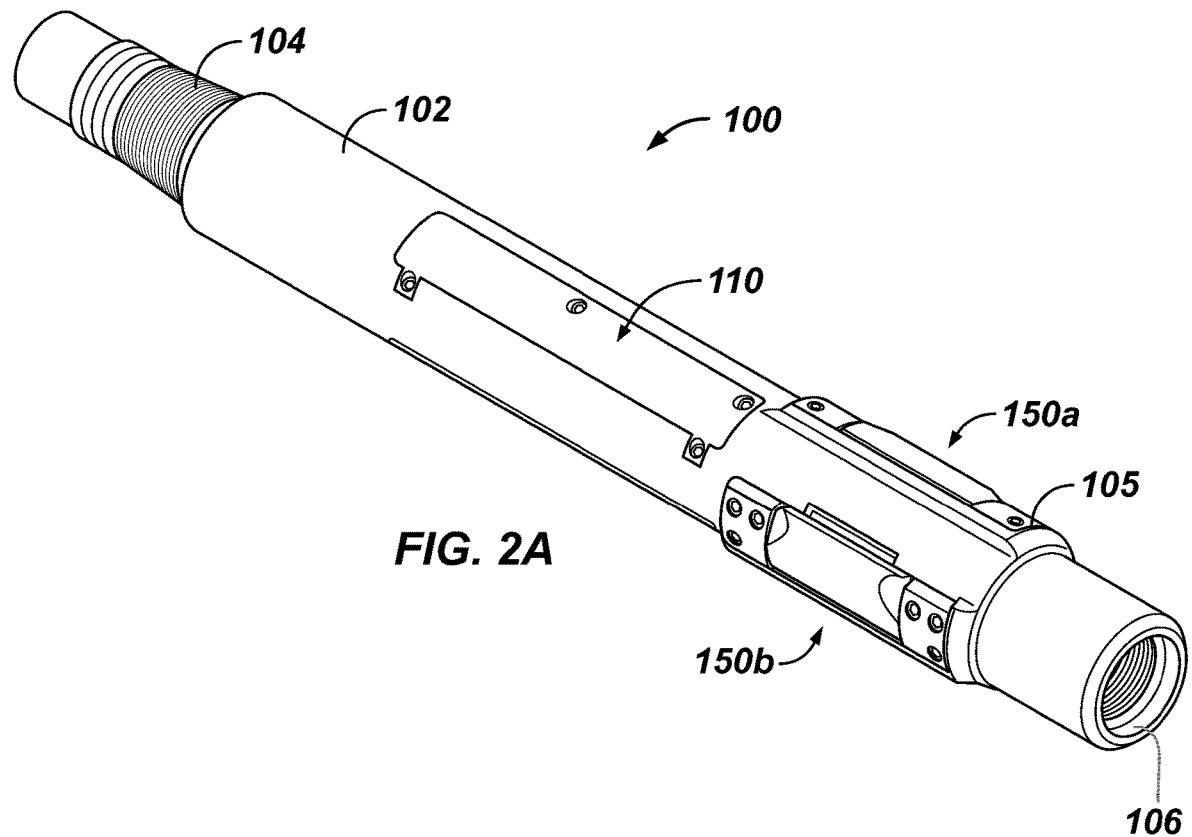
FIGS. 2A-2B illustrate the steering apparatus in perspective and end views.
Figure 2B:
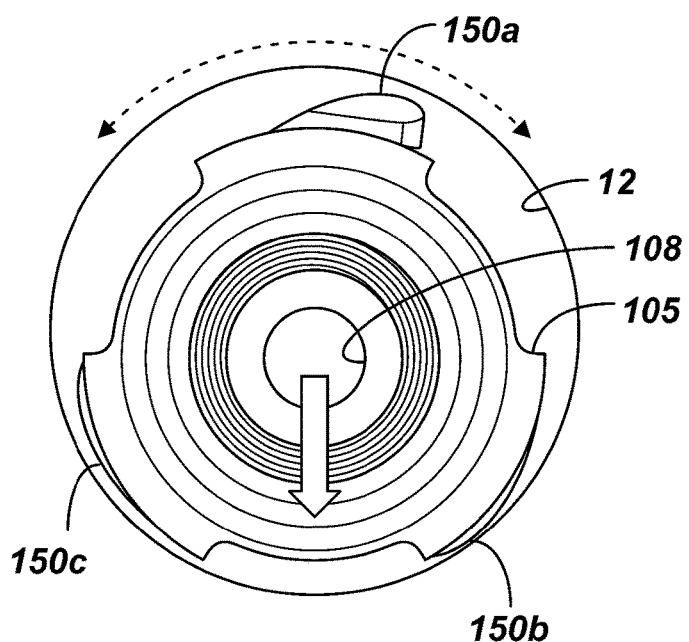

FIG. 2A illustrates a perspective view of portion of a steering apparatus 100 for the drilling assembly (20) according to the present disclosure. Further details of the steering apparatus 100 are provided in the end-view of FIG. 2B.

As already noted, the steering apparatus 100 of the drilling assembly (20) is disposed on a drillstring (22) for deviating a borehole advanced by the drill bit (40). The apparatus 100 has a housing or drill collar 102 having a through-bore 108 for passage of drilling fluid. The drill collar 102 couples at an uphole end 104 (with pin thread) to uphole components of the assembly (20), such as control assembly (30), stabilizer, other drill collar, drillstring (22), mud motor, or the like. The drill collar 102 couples at a downhole end 106 (with box thread) to downhole components of the assembly (20), such as another drill collar, stabilizer, the drill bit (40), or the like.

Multiple directional devices or directors 150a-c are disposed on the housing 102 near the downhole end (106), and each of the directors 150a-c can be associated with a common controller 110 or with its own controller 110 also disposed on the housing 102. The directors 150a-c can be arranged on multiple sides of the housing 102 (either symmetrically or asymmetrically), and they can be disposed at stabilizer ribs 105 or other features on the housing 102.

Preferably, the arrangement is symmetrical or uniform, which simplifies control and operation of the apparatus 100, but this is not strictly necessary. As shown here in FIG. 2B, for example, the steering apparatus 100 includes three directors 150a-c arranged at about every 120-degrees. In general, more or fewer devices 150a-c can be used.

Figure 3A:
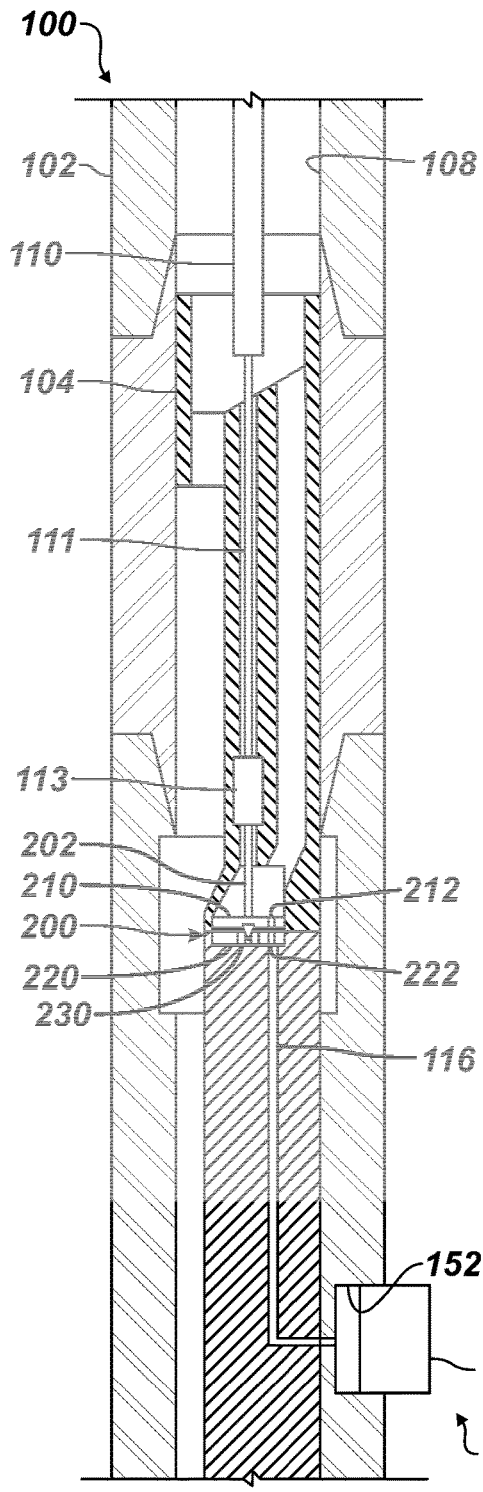
FIG. 3A illustrates one embodiment of the steering apparatus having a counter-rotating actuator and a rotary disk valve to control directors.
Figure 3B:
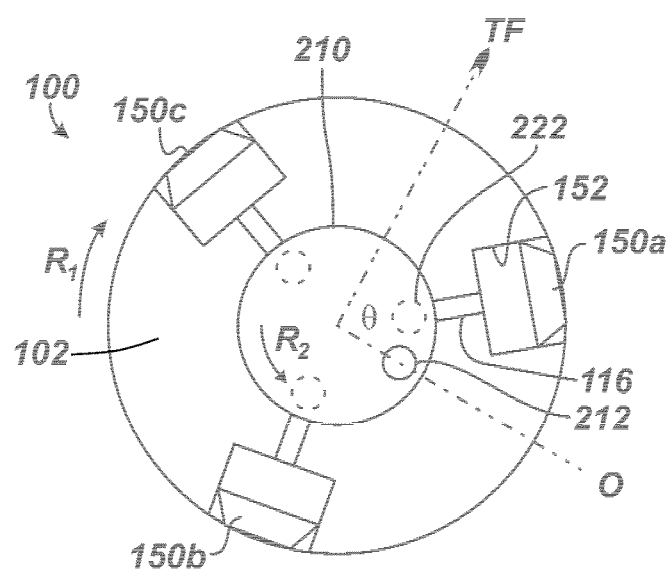
FIGS. 3B-3C schematically illustrate end views of the steering apparatus of FIG. 3A during operation.
Figure 3C:
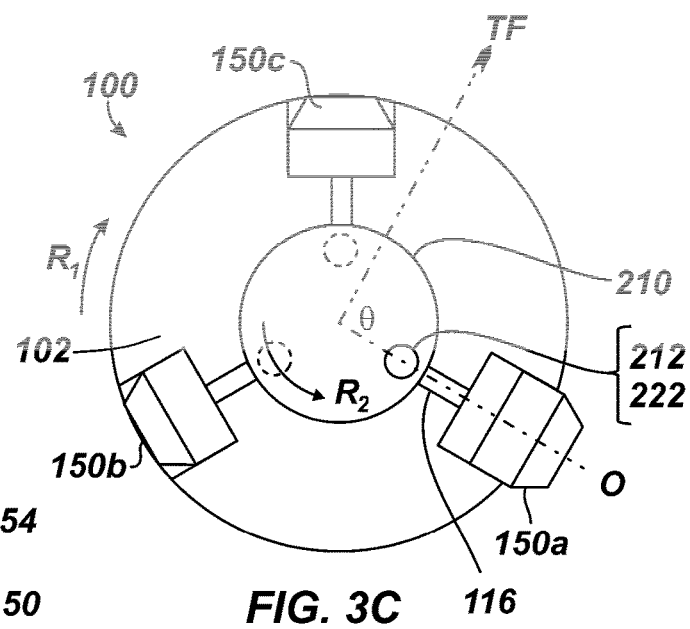

FIG. 3A illustrates one embodiment of the steering apparatus 100 having a counter-rotating ("roll-stabilized") controller 110 and rotary disk valve 200 to control the directors 150a-c. FIGS. 3B-3C schematically illustrate end views of the steering apparatus 100 of FIG. 3A during operation.

To achieve directional control while drilling, the directional devices 150a-c are hydraulically connected to and controlled by the roll-stabilized controller 110 and rotary disk valve 200 that extends the directional devices 150a-c based on control of the control assembly (30) so the directional devices 150a-c can apply a lateral bias or bit side force to change the direction of drilling.

Again, the apparatus 100 has a housing 102 interconnected between the drillstring (22) and the drill bit (40), and the directional devices 150a-c are disposed about the housing 102. The devices 150a-c each include a hydraulic piston 154 disposed in a chamber 152, which is supplied by drilling fluid under pressure through a passage 116 in the housing 102 under the control of the rotating disk valve 200 of the present disclosure.

In operation, a portion of the rotating disk valve 200 is oriented/rotated relative to the housing 102 to divert the pressurized drilling fluid supplied from the surface sequentially to the chambers 152 to extend the corresponding pistons 154 for the directional device 150a-c. The rotation is controlled by the roll-stabilized controller 110 and can be synchronized to the rotation of the housing 102. In this way, as the housing 102 rotates, each directional device 150a-c can be respectively extended outward at a same rotational position so as to push the housing 102 laterally and control the direction of drilling.

As shown in FIG. 3A, the rotating disk valve 200 is contained within a valve assembly 104 and has a control shaft 111 driven by the roll-stabilized controller 110. In operation, the control shaft 111 transmits torque through a spring housing 113 to a rotor 202, which is connected to a controllable or selective disk or seal 210 of the valve 200. The spring housing 113 applies a preload through the rotor 202 and controllable disk 210 to a bearing assembly 230 engaged against a fixed or non-selective disk or seal 230 of the disk valve 200. Further details of the rotary disk valve 200, seals 210 and 220, and bearing assembly 230 are discussed further below. The orientation of the selective disk 210 is controlled based on a desired direction so that the corresponding directional devices 150a-c rotating with the housing 102 can be extended to bias/push the housing 102 in the desired direction.

As shown in FIGS. 3B-3C, the housing 102 rotates in one direction $R_1$, while the roll-stabilized controller 110 counter-rotates in an opposite direction $R_2$, resulting in roll-stabilization. Controlled by the controller 110, an inlet orifice 212 of the selective disk 210 can be oriented at a desired orientation O, which can be a measured angle θ relative to the apparatus' toolface TF or other frame of reference as determined according to known techniques. The non-selective disk 220 rotates with the housing 102, and the disk's outlet orifices 222 eventually align the inlet orifice 212 of the selective disk 210 (see FIG. 3C). The pressurized drilling fluid within the valve assembly 104 can then communicate into the passage 116 for the chamber 152 and can extend the piston 154 of the respective directional device 150 at the desired orientation O.

As shown, the non-selective disk 220 can have several of the outlet orifices 222 (e.g., one for each directional device 150a-c) so the outlet orifices 222 can be sequentially exposed during operations to the oriented inlet orifice 212 of the selective disk 210. Although the selective disk 210 may have one orifice 212, it may have more than one and may have an orifice of a desired shape for an implementation. In fact, rather than an orifice, the disk 210 may instead have a cutaway, cutout, missing segment, or the like.

In the previous embodiment of the steering apparatus 100 of FIGS. 3A-3C, one rotary disk valve 200 was used to sequentially operate multiple directional devices 150a-c. Other configurations are possible. For example, each directional device 150a-c on the steering apparatus 100 may have its own rotary disk valve 200 to control the delivery of pressurized fluid thereto.

Figure 4C:
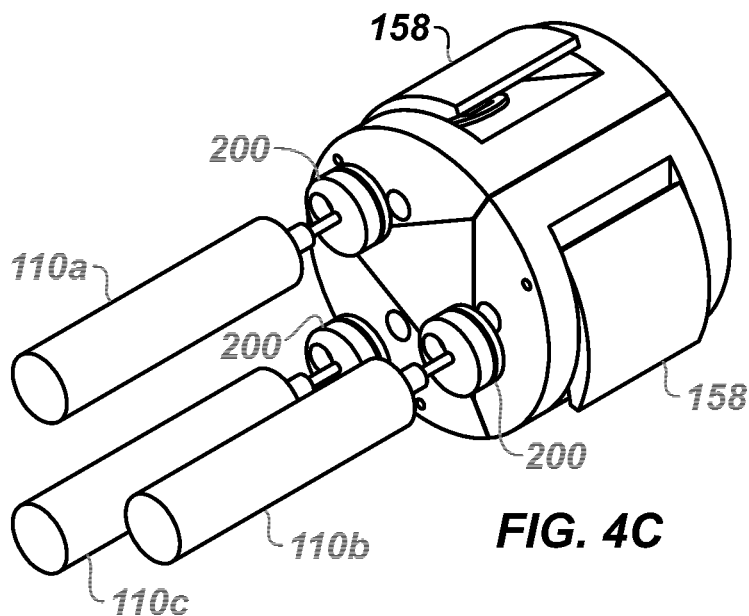
FIG. 4C illustrates isolated components of the steering apparatus in FIG. 4B.

For example, FIGS. 4A-4C illustrate another embodiment of the steering apparatus 100 having multiple controllers 110 and rotary disk valves 200 to independently control multiple directors 150a-c. FIG. 4A schematically illustrates the arrangement of the steering apparatus 100, FIG. 4B illustrates a cross-section of such a steering apparatus 100 in FIG. 4A, and FIG. 4C illustrates isolated components of the apparatus 100 of FIG. 4B.

As shown in FIG. 4A, the control assembly 30 connects to multiple controllers 110a-c, each having an actuator 112, a rotary disk valve 200, and a directional device 150a-c. (Several directional devices 150a-c are schematically shown here for illustrative purposes, but the apparatus 100 can have more or less as desired.)

The control assembly 30 connects to the sensors (32), the power source (34), etc., such as discussed above with respect to FIG. 1. The control assembly 30 also connects to each of the actuators 112 of the controllers 110 for the directional devices 150a-c. Each actuator 112 operates a rotary disk valve 200 so each device 150a-c is independently operable to move its movable element or pad 158 between an extended condition and a retracted condition.

Various devices can be used for the actuator 112, such as hydraulic valves, electric motors, solenoids, and the like. Likewise, various devices can be used for the directional device 150, such as pistons, pads, arms, and the like. In one particular arrangement, for example, each actuator 112 orients its respective the rotary disk valve 200 to direct a portion of bore flow (108) (passing through the apparatus 100 from the drillstring (22) to the drill bit (40)) to a piston chamber 152 having a piston 154. (Although disclosed herein as using the fluid flow from the bore 108 through the apparatus 100 to direct the apparatus 100, other arrangements can be used. For example, a separate hydraulic system 16 shown in FIG. 4A can be used on the apparatus 100 that is sealed from drilling fluids, and the control assembly 30 can control each actuator 112 to orient its respective the rotary disk valve 200 to direct the hydraulic fluid from the hydraulic system 16 to the piston chamber 152 having the piston 154.)

Directed flow (116) from the valve 200 can activate the respective piston 154 in the piston chamber 152 to move the pad 158 to engage the borehole as the apparatus (100) rotates. The piston chamber 152 may simply expel fluid, which can allow the pad 158 to retract from the borehole as the apparatus 100 rotates when fluid pressure is not supplied. For example, vent(s) (not shown) in the chamber 152 may allow for venting of fluid from the chamber 152 to the borehole annulus, which can allow the piston 154 to retract in the chamber 152 and can clean the chamber 152 of debris. The venting can use one or more ports (not shown) in the chamber 152 that are always open to the borehole annulus. The venting can also be achieved in a number of other ways. For example, a separate valve (not shown) can be used to vent the fluid from the chamber 152. As will be appreciated, other actuators 112 and directional devices 150 can be used to achieve similar actuations and can rely on hydraulics, mechanical engagement, electric power, or other motive source.

By independently operating the multiple directional devices 150a-c, the steering apparatus 100 steers the assembly (20) using active deflection as the apparatus 100 rotates with the drillstring (22). Therefore, the steering apparatus 100 of FIGS. 4A-4C operates to steer drilling during rotation about the apparatus' axis. This rotation of the apparatus 100 can average 300-rpm or more. Each actuator 112 can be operated to extend its piston 158 at the same target position, synchronous to the apparatus' rotation. Meanwhile, the rotary position of the apparatus 100 is determined by the control assembly 30.

Figure 5A:
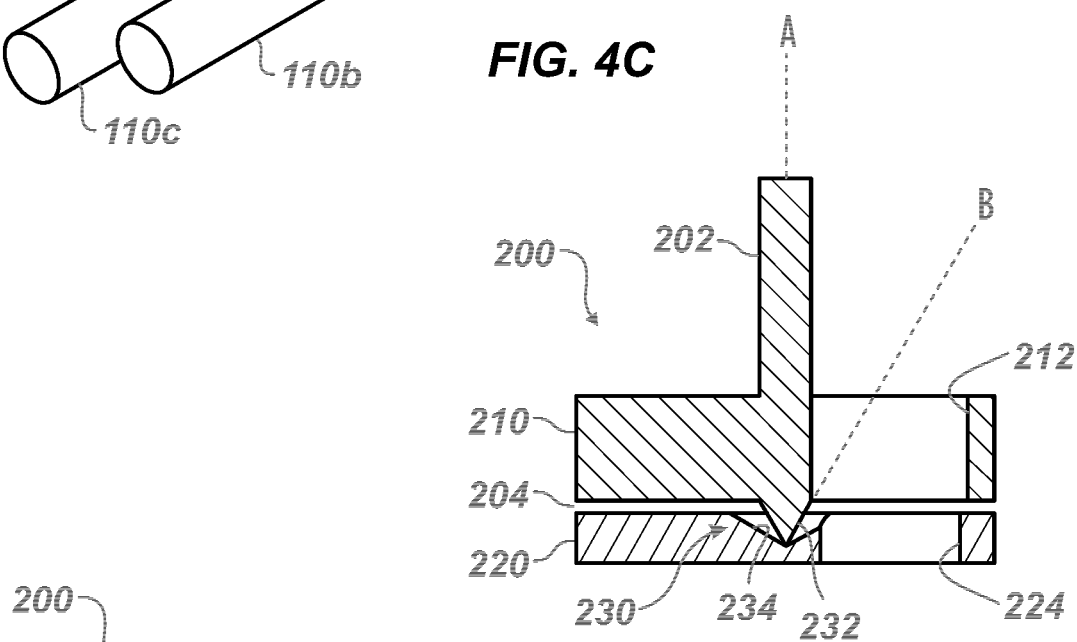
FIGS. 5A-5B illustrate detailed cross-section of a rotary disk valve for the steering apparatus of FIGS. 3A-3C and 4A-4C.
Figure 5B:
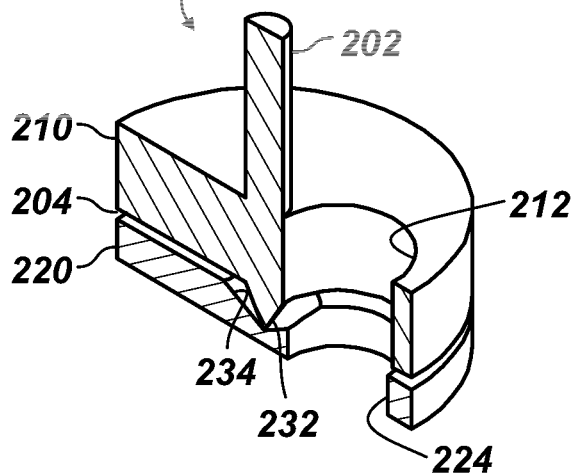

FIGS. 5A-5B illustrate one embodiment of a rotary disk valve 200 for the steering apparatus 100 of the present disclosure, such as disclosed in FIGS. 3A-3C and 4A-4C. The rotary disk valve 200 includes a selective disk or seal 210 and a non-selective disk or seal 220. The selective disk 210 connects to or includes a rotor or spindle 202 used for orienting (turning) the disk 210. The selective disk 210 includes an inlet 212 that can align with an outlet 224 on the non-selective disk 220. This rotary disk valve 200 may be 2-way (ON-OFF), but may stop at any point throughout one rotation to provide a proportionate amount of flow.

A bearing assembly 230 disposed between the disks 210, 220 includes a male bearing 232 and a female bearing 234. The male bearing 232 extends from the selective disk 210 and fits into the female bearing 234 defined in the non-selective disk 220. As shown, the male bearing 232 can be an integrally-formed protrusion, cone, point, or the like that is part of the selective disk 210. Likewise, the female bearing 234 can be an integrally-formed seat, pocket, or the like defined in the surface of the non-selective disk 220.

The mated bearings 232 and 234 provide both radial and axial support between the two disks 210, 220, which remain separated from one another by a separation 204. Additionally, as best shown in FIG. 5B, the surfaces of the male and female bearings 232, 234 mated with one another have an interface B angled off the axis A—i.e., the interface B of the bearing surfaces are not parallel or perpendicular to the axis A and instead lie at an angle. In other words, the conical point 232 and the conical seat 234, for example, are shown in FIG. 5B have an interface B set at an angle α off the axis A. The angular orientations of the point 232 and the seat 234 at the interface B can be different from one another as shown (or can be the same as one another).

Figure 6A:
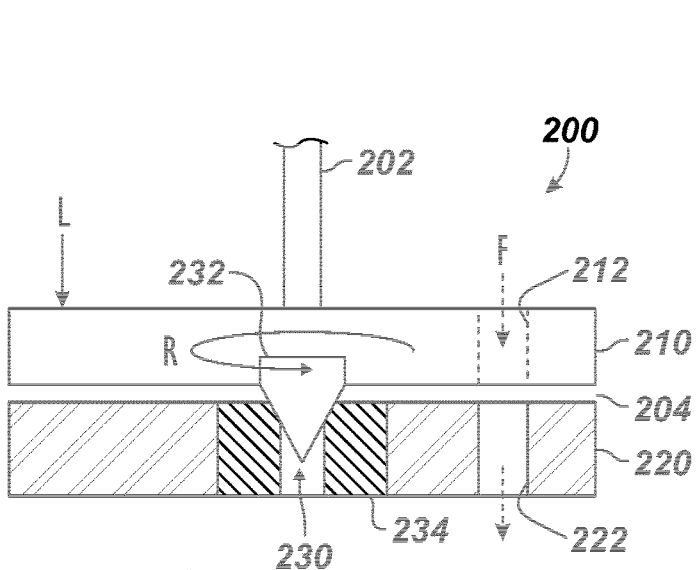
FIGS. 6A-6D illustrate different configurations for the rotary disk valve according to the present disclosure for the steering apparatus of FIGS. 3A-3C and 4A-4C.
Figure 6D:
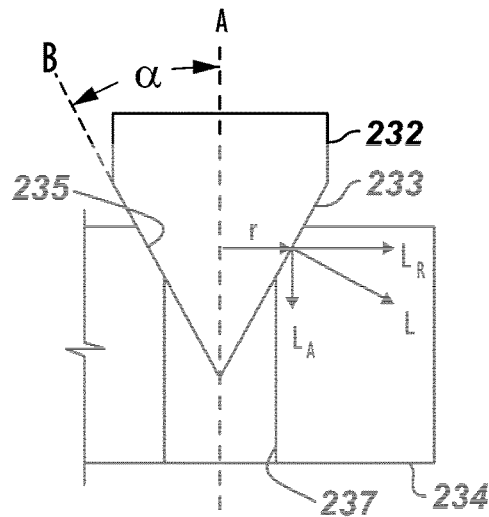
Figure 6B:
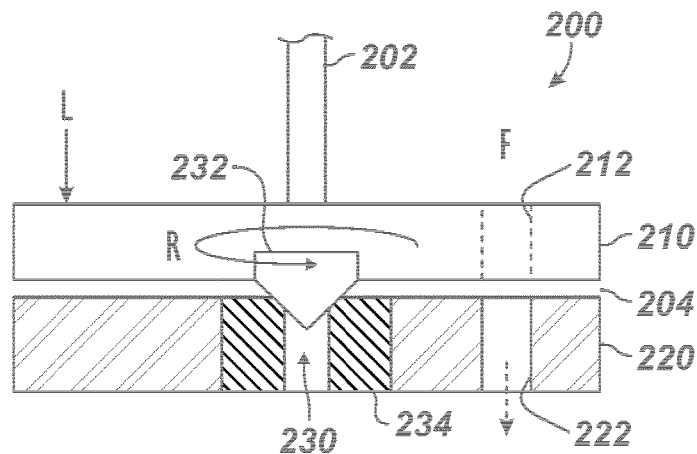
Figure 6C:
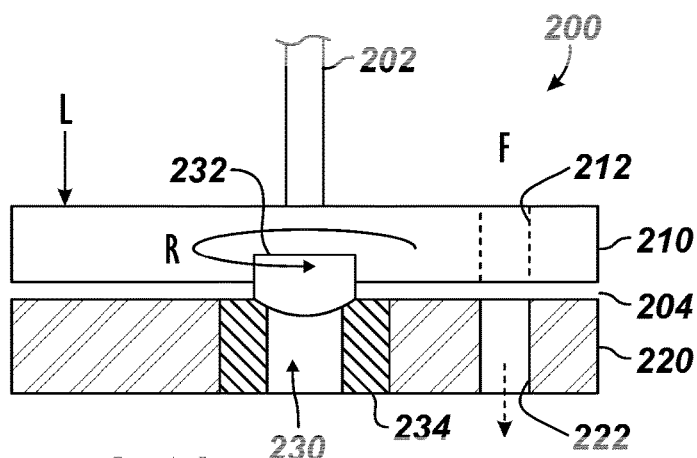

FIGS. 6A-6C illustrate different configurations for a rotary disk valve 200 according to the present disclosure, which can be used for the steering apparatus 100 such disclosed in FIGS. 3A-3C and 4A-4C. Again, each rotary disk valve 200 of FIGS. 6A-6C includes a selective disk or seal 210 and a non-selective disk or seal 220. The selective disk 210 can have its orientation controlled (rotated about an axis A) by a rotor or shaft 202 connected to a rotary actuator (not shown) of a controller (110). The selective disk 210 is positioned adjacent the opposing non-selective disk 220, which does not have its orientation controlled and which is fixed with the housing (102).

Depending on its orientation, the valves 200 direct pressurized fluid flow from a first side 201a of the valve 200 to a second side 201b of the valve 200. The selective disk 210 is selectively orientable about the axis 202, and one or more inlets 212 communicate with the pressurized fluid from the first side 201a of the valve 200. The inlet 212 may be in the form of an orifice, cutaway, cutout, missing segment, or the like.

The non-selective disk 220 is disposed adjacent the selective disk 210, and the one or more outlets 222 communicate the pressurized fluid to the valve's second side 201b when aligned with the inlet 212. The outlet 222 may likewise be in the form of an orifice, cutaway, cutout, missing segment, or the like. This rotary disk valve 200 may be 2-way (ON-OFF), but may stop at any point throughout one rotation to provide a proportionate amount of flow.

Differential pressure of the pressurized drilling fluid causes the selective disk 210 to apply a hydraulic load (L) against the non-selective disk 220. To reduce detrimental friction from this hydraulic load (L), the rotating disk valve 200 uses the centrally-located bearing assembly 230 disposed between the disks 210, 220. As shown, the bearing assembly 230 is disposed at the axis A between the disks 210, 220 and has the male bearing 232 and the female bearing 234 mated with one another.

The bearing assembly 230 disposed between the disks 210, 220 separates adjacent surfaces of the disks 210, 220 by a separation 204. Fluid can fill the separation 204 between the adjacent surfaces of the disks 210, 220 and can form a fluid seal, even while fluid in the separation 204 may be able to leak past the valve 200.

Rather than having integrally-formed bearings as in FIGS. 5A-5B, the rotary disk valves 200 of FIGS. 6A-6C include a bearing assembly 230 with the separate male and female bearings 232, 234 disposed between the disks 210, 220. In fact, the male bearing 232 can be an independent component disposed on, affixed to, embedded in, etc. the first seal 210, and the female bearing 234 can be an independent component disposed on, affixed to, embedded in, etc. the second seal 220.

In general, the male bearings 232 in FIGS. 6A-6C have a protruding end 233 that fits and rotates in a mating pocket or seat 235 of the female bearing 234. In the configurations of FIGS. 6A-6B, for example, the male bearing assembly 232 has a conical point for the protruding end 233 extending along the axis 202, and the female bearing 234 defines a conical seat 235 disposed at the axis 202 to receive the conical point 233 therein.

As shown in FIG. 6B, the width and height of the conical point 233 of the male bearing 232 and corresponding mating seat 235 of the female bearing 234 can be wider, shorter, narrower, etc., depending on the implementation, loads, overall disk size, bearing materials, etc. As shown, the angular orientations of the point 233 and the seat 235 at the interface B can be the same as one another, although they can be different from one another as noted previously.

The protruding end 233 and mating pocket 235 of the bearings 232, 234 can also have shapes other than a cone, such as spherical, rounded, etc. In the configuration of FIG. 6C, for example, the male bearing 232 has a spherical point 233 extending from the axis 202, and the female bearing 234 has a spherical seat 235 disposed at the axis 202 to receive the spherical point therein.

As shown in FIGS. 6A-6C, the female bearing 234 can define a bore 237 therethrough. The bore 237 may help the bearings 232, 234 to seat with one another by allowing the male bearing 232 to experience the pressure differential between the two sides 201a-b of the valve 200.

The bearing material used for the male and female bearings 232, 234 can be one of any number of ceramics, including polycrystalline diamond, polycrystalline cubic boron nitride, or the like. The center bearing 230 also allows the rotating disk valve 200 to last longer without detrimental wear of the disks' surfaces. Additionally, the bearing assembly 230 can reduce the starting torques required to initially rotate (alter the orientation of) the selective disk 210 relative to the non-selective disk 220.

As shown in FIG. 6D, the surfaces of the male and female bearings 232, 234 mated with one another have an interface B angled off the axis A—i.e., the interface B of the bearing surfaces are not parallel or perpendicular to the axis A and instead lie at an angle. In other words, the conical point 233 and the conical seat 235, for example, are shown in FIG. 6D have an interface B set at an angle α off the axis A. (A spherical point and seat can similarly have a tangential interface B between them set at such an angle α off the axis A.)

The bearing assembly 230 improves issues with torque by reducing the surface area friction between the disks 210, 220 and reducing the radius (r) about which the load (L) is supported while rotating. By reducing the radius (r) and friction of the rotating load support, the torque required to operate the valve 200 is significantly reduced. This is accomplished by the use of the mating male and female bearings 232, 234 where the male bearing 232 sits partially inside the female bearings 234 at the male's point or near-point. The shape supports the load (L) in both axial and radial directions, where an axial load component ($L_A$) is defined as along the axis (A) of rotation from the rotor 202 and a radial load component ($L_R$) is perpendicular to the axis (A) of rotation. (A similar benefit is provided by the integral bearing assembly 230 of FIGS. 5A-5B.)

In the configurations of FIGS. 6A-6D, the bearing surfaces of the bearing assembly 230 are isolated from the seal surfaces of the disks 210, 220 so each function independent of one another. In this way, the torque is not born across the larger sealing area of the disks 210, 220. This will significantly decrease the energy needed to operate the valve 200. Separating the seal area from the bearing area also allows for separate materials to be used for the independent bearing and sealing purposes. Accordingly, the material of the disks 210, 220 can be different from that of the bearing assembly 230 and can be chosen according to particular sealing characteristics apart from bearing characteristics.

The disclosed configurations of the rotary disk valve 200 in FIGS. 5A-5B and 6A-6D having the bearing assembly 230 reducing the friction and the radius (r) of the rotating load (L), supporting the load (L) in both axial and radial directions, and separating the bearing surface from the sealing surfaces of the disks 210, 220 are superior to the common rotary disk arrangement that simply has two adjacent disks in frictional contact with one another. The disclosed configurations are also superior to an arrangement having two adjacent disks in frictional contact with one another that simply use a cylindrical pin received in registering socket(s) to radially locate the rotating disks.

Figure 7:
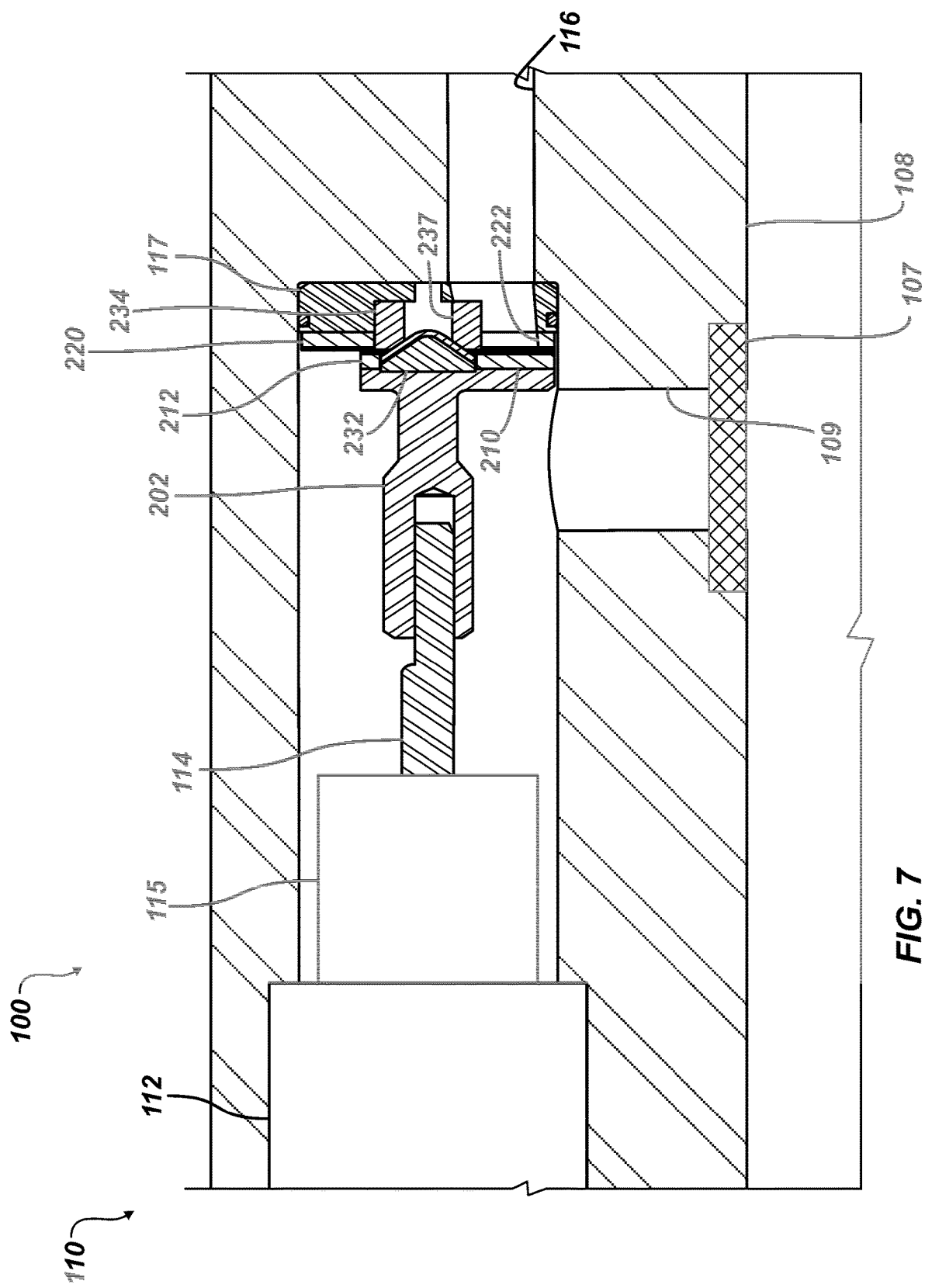
FIG. 7 illustrates a cross-section of another steering apparatus with a rotary disk valve according to the present disclosure.

Turning now to FIG. 7, an embodiment of a rotary disk valve 200 having a bearing assembly 230 as discussed above is shown in a portion of a steering apparatus 100. The actuator 112 turns a control shaft 114, which transmits torque to a rotor 202 through a housing 115. The rotor 202 supports the selective disk 210 adjacent the non-selective disk 220.

Springs and seals of the housing 115 can apply a preload through the rotor 202 and selective disk 210 to the non-selective disk 210, which is supported by a holder 117 on part of the housing 102. When the selective disk 210 is properly aligned with the non-selective disk 220, the outlet 222 in the non-selective disk 220 is exposed to the pressurized drilling fluid, which has entered the valve 200 through a port 109 covered by a filter 107 in the housing's main bore 108. The outlet 222 can be selectively exposed in operation by the rotating selective disk 210 to communicate fluid from the port 109 with a passage 116 connected to the respective directional device (150).

In this example, the male bearing 232 is a combined rounded, conical shape and includes a surface coating. The female bearing 234 defines a bore 237 therethrough. This bore 237 can be exposed to the pressure on the second side of the valve 200 by an opening in the holder 117. In this way, the male bearing 232 is subject to the pressure differential across the valve 200.

As discussed above, the ported and concentrically-arranged rotating disks 210, 220 are used to deliver high pressure fluid into a lower pressure volume to perform mechanical work, such moving a piston. The disks 210, 220 form a seal that can selectively disrupt flow and can selectively open flow and preferably achieves this with minimum energy or torque applied. As will be appreciated, the rotating disk valve 200 can suffer from high rates of wear and high torque to operate. This torque is classically dependent upon the pressure differences across the seal(s) and the area of the closed flow port(s). Specialized materials can be used for the rotating disk valve 200 to reduce rates of wear and to provide lower coefficients of friction, both static and kinetic. For example, hard ceramics may be employed due to their low friction, thermal stability, and long lifespans in severe service.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A valve for directing pressurized fluid from a first side of the valve to a second side of the valve, the valve comprising:
   a first seal being selectively orientable about an axis and having at least one inlet, the at least one inlet communicating with the pressurized fluid from the first side;
   a second seal disposed adjacent the first seal and having at least one outlet, the at least one outlet communicating the pressurized fluid to the second side at least when aligned with the at least one inlet; and
   a bearing assembly disposed at the axis between the first and second seals and separating adjacent seal surfaces of the first and second seals by a separation, the bearing assembly having a male bearing surface and a female bearing surface, the male and female bearing surfaces being mated with one another and having an interface angled off the axis.

2. The valve of claim 1, wherein the male bearing surface comprises a conical surface disposed about the axis; and wherein the female bearing surface comprises a conical seat disposed about the axis and engaging the conical surface thereagainst.

3. The valve of claim 2, wherein the conical seat defines a bore therethrough along the axis.

4. The valve of claim 1, wherein the male bearing surface comprises a spherical surface disposed about the axis; and wherein the female bearing surface comprises a spherical seat disposed about the axis and engaging the spherical surface thereagainst.

5. The valve of claim 4, wherein the spherical seat defines a bore therethrough along the axis.

6. The valve of claim 1, wherein the male bearing surface is subject to a first pressure from the pressurized fluid on the first side, wherein the female bearing surface defines a bore therethrough along the axis exposed to the second side, the bore subjecting the male bearing surface to a second pressure from the pressurized fluid on the second side.

7. The valve of claim 1, wherein the adjacent seal surfaces of the first and second seals form a fluid seal in the separation.

8. The valve of claim 1, wherein the bearing assembly comprises a first material different from a second material of the first and second seals.

9. The valve of claim 1, wherein the male bearing surface is integrally formed as part of the first seal, and wherein the female bearing surface is integrally defined as part of the second seal.

10. The valve of claim 1, further comprising a rotary actuator operable to selectively orient the first seal about the axis.

11. A rotary steerable tool for directional drilling with a drillstring and a drill bit, the tool comprising:
    a housing disposed between the drillstring and the drill bit and communicating drilling fluid from the drillstring to the drill bit;
    at least one external director disposed on the housing and hydraulically movable to an extended condition relative to the housing; and
    at least one valve disposed on the housing and selectively directing pressurized source fluid from a first side of the valve to the at least one external director on a second side of the valve, the at least one valve comprising:
        a first seal being selectively orientable about an axis and having at least one inlet, the at least one inlet communicating with the pressurized source fluid from the first side;
        a second seal disposed adjacent the first seal and having at least one outlet, the at least one outlet communicating the pressurized source fluid to the second side at least when aligned with the at least one inlet; and
        a bearing assembly disposed at the axis between the first and second seals, the bearing assembly having a male bearing surface and a female bearing surface, the male and female bearing surfaces being mated with one another and having an interface angled off the axis.

12. The tool of claim 11, wherein the male bearing surface comprises a conical surface disposed about the axis; and wherein the female bearing surface defines a conical seat disposed about the axis and receiving the conical surface therein.

13. The tool of claim 11, wherein the male bearing surface comprises a spherical surface disposed about the axis; and wherein the female bearing surface comprises a spherical seat disposed about the axis and receiving the spherical surface therein.

14. The tool of claim 11, wherein the male bearing surface is subject to a first pressure from the pressurized source fluid on the first side, wherein the female bearing surface defines a bore therethrough along the axis exposed to the second side, the bore subjecting the male bearing surface to a second pressure from the pressurized source fluid on the second side.

15. The tool of claim 11, wherein the bearing assembly disposed between the first and second seals separates adjacent seal surfaces of the first and second seals by a separation.

16. The tool of claim 15, wherein the adjacent seal surfaces of the first and second seals form a fluid seal in the separation.

17. The tool of claim 11, wherein the bearing assembly comprises a first material different from a second material of the first and second seals.

18. The tool of claim 11, wherein the tool comprises more than one of the at least one external directors; and wherein the at least one valve selectively directs at least portion of the pressurized source fluid to the more than one external directors.

19. The tool of claim 18, further comprising an actuator operable to selectively orient the first seal of the at least one valve about the axis.

20. The tool of claim 19, wherein the actuator is counter-rotated relative to rotation of the housing; and wherein the tool comprises at least one controller sensing orientation of the counter-rotated actuator relative to a point of reference and actuating the actuator to selectively orient the first seal relative to the point of reference.

21. The tool of claim 11, wherein the tool comprises more than one of the at least one external directors and comprises more than one of the at least one valve; and wherein each of the external directors has a respective one of the valves selectively directing at least the portion of the pressurized source fluid to the external director.

22. The tool of claim 21, further comprising a plurality of actuators each operable to selectively orient the first seal of the respective valve about the axis.

23. The tool of claim 22, wherein each of actuators rotate with the housing; and wherein the tool comprises at least one controller sensing orientation of each of the actuators relative to a point of reference and actuating each of the actuators to selectively orient the respective first seal relative to the point of reference.

24. The tool of claim 11, wherein the housing defines a bore communicating the drilling fluid, the bore defining at least one port in communication with the first side of the at least one valve and providing at least a portion of the drilling fluid as the pressurized source fluid.

25. The tool of claim 24, further comprising a filter filtering the drilling fluid from the bore to the port.

26. The tool of claim 11, wherein the tool comprises a hydraulic system providing hydraulic fluid as the pressurized source fluid.

27. A valve for directing pressurized fluid from a first side of the valve to a second side of the valve, the valve comprising:
    a first seal being selectively orientable about an axis and having at least one inlet, the at least one inlet communicating with the pressurized fluid from the first side;
    a second seal disposed adjacent the first seal and having at least one outlet, the at least one outlet communicating the pressurized fluid to the second side at least when aligned with the at least one inlet; and
    a bearing assembly disposed at the axis between the first and second seals, the bearing assembly having a male bearing surface and a female bearing surface, the male and female bearing surfaces being mated with one another and having an interface angled off the axis, the male bearing surface being subject to a first pressure from the pressurized fluid on the first side, the female bearing surface defining a bore therethrough along the axis exposed to the second side, the bore subjecting the male bearing surface to a second pressure from the pressurized fluid on the second side.

28. The valve of claim 27, wherein the male bearing surface comprises a conical surface disposed about the axis and the female bearing surface comprises a conical seat disposed about the axis and engaging the conical surface thereagainst; or wherein the male bearing surface comprises a spherical surface disposed about the axis and the female bearing surface comprises a spherical seat disposed about the axis and engaging the spherical surface thereagainst.

29. The valve of claim 27, wherein the bearing assembly disposed between the first and second seals separates adjacent seal surfaces of the first and second seals by a separation; and wherein the adjacent seal surfaces of the first and second seals form a fluid seal in the separation.

30. The valve of claim 27, wherein the bearing assembly comprises a first material different from a second material of the first and second seals; or wherein the male bearing surface is integrally formed as part of the first seal and the female bearing surface is integrally defined as part of the second seal.

31. The valve of claim 27, further comprising a rotary actuator operable to selectively orient the first seal about the axis.

32. A rotary steerable tool for directional drilling with a drillstring and a drill bit, the tool comprising:
   a housing disposed between the drillstring and the drill bit and communicating drilling fluid from the drillstring to the drill bit;
   a valve disposed on the housing and selectively directing pressurized source fluid from a first side of the valve to a second side of the valve, the valve comprising:
      a first valve element being selectively orientable about an axis;
      a male bearing disposed at the axis on the first valve element;
      a second valve element disposed adjacent the first valve element and configured to communicate the pressurized source fluid from the first side to the second side of the valve based on the selective orientation of the first valve element;
      a female bearing disposed at the axis on the second valve element, the female bearing being mated with the male bearing and having an interface therewith angled off the axis; and
   an external director disposed on the housing and being hydraulically movable to an extended condition relative to the housing in response to the pressurized fluid on the second side of the valve.

33. The tool of claim 32, wherein the male bearing comprises a conical surface disposed about the axis and the female bearing defines a conical seat disposed about the axis and receiving the conical surface therein; or wherein the male bearing comprises a spherical surface disposed about the axis and the female bearing comprises a spherical seat disposed about the axis and receiving the spherical surface therein.

34. The tool of claim 32, wherein the male bearing is subject to a first pressure from the pressurized source fluid on the first side; and wherein the female bearing defines a bore therethrough along the axis exposed to the second side, the bore subjecting the male bearing to a second pressure from the pressurized source fluid on the second side.

35. The tool of claim 32, wherein the male and female bearings disposed between the first and second valve elements separate adjacent surfaces of the first and second valve elements by a separation; and wherein the adjacent surfaces form a fluid seal in the separation.

36. The tool of claim 32, wherein the tool comprises:
   more than one of the external director, the second valve element being configured to selectively direct at least portion of the pressurized source fluid to the more than one external director;
   an actuator operable to selectively orient the first valve element about the axis, the actuator being counter-rotated relative to rotation of the housing; and
   a controller sensing orientation of the counter-rotated actuator relative to a point of reference and actuating the actuator to selectively orient the first valve element relative to the point of reference.

37. The tool of claim 32, wherein the tool comprises:
   more than one of the external director;
   more than one of the valve, each valve associated with a respective one of the external directors and configured to selectively direct at least the portion of the pressurized source fluid to the respective external director;
   a plurality of actuators each operable to selectively orient the first valve element of a respective one of the valves about the axis, each of actuators rotating with the housing; and
   at least one controller sensing orientation of each of the actuators relative to a point of reference and actuating each of the actuators to selectively orient the respective first valve element relative to the point of reference.

38. The tool of claim 32, wherein the housing defines a bore communicating the drilling fluid, the bore defining at least one port in communication with the first side of the valve and providing at least a portion of the drilling fluid as the pressurized source fluid; or wherein the tool comprises a hydraulic system providing hydraulic fluid as the pressurized source fluid.

* * * * *